(12) United States Patent
Ballarotti

(10) Patent No.: US 9,708,133 B2
(45) Date of Patent: Jul. 18, 2017

(54) DEVICE FOR THE SORTED FEEDING OF A PACKAGING MACHINE FOR BOTTLES AND THE LIKE

(71) Applicant: P.E. LABELLERS S.P.A., Porto Mantovano (IT)

(72) Inventor: Mario Ballarotti, Marmirolo (IT)

(73) Assignee: P.E. LABELLERS S.P.A., Porto Mantovano (IT)

( * ) Notice: Subject to any disclaimer, the term of this patent is extended or adjusted under 35 U.S.C. 154(b) by 0 days.

(21) Appl. No.: 14/902,545

(22) PCT Filed: Jun. 16, 2014

(86) PCT No.: PCT/EP2014/062554
§ 371 (c)(1),
(2) Date: Dec. 31, 2015

(87) PCT Pub. No.: WO2015/000680
PCT Pub. Date: Jan. 8, 2015

(65) Prior Publication Data
US 2016/0376111 A1    Dec. 29, 2016

(30) Foreign Application Priority Data

Jul. 4, 2013    (IT) .............................. VR2013A0155

(51) Int. Cl.
*B65G 47/38*    (2006.01)
*B65G 47/71*    (2006.01)
(Continued)

(52) U.S. Cl.
CPC ............. *B65G 47/38* (2013.01); *B65G 29/00* (2013.01); *B65G 47/71* (2013.01); *B65G 47/846* (2013.01);
(Continued)

(58) Field of Classification Search
CPC ............................. B65G 47/71; B65G 47/846
(Continued)

(56) References Cited

U.S. PATENT DOCUMENTS 3,687,285 A * 8/1972 Messervey .......... G01M 3/3209
                                                    198/370.05
5,388,820 A   2/1995 Eberle et al.
(Continued)

FOREIGN PATENT DOCUMENTS

CN    1349440 A    5/2002
EP    0557680 A1   9/1993
(Continued)

OTHER PUBLICATIONS

International Search Report, PCT/EP2014/062554, mailed Nov. 8, 2014.
(Continued)

*Primary Examiner* — Leslie A Nicholson, III
*Assistant Examiner* — Lester Rushin
(74) *Attorney, Agent, or Firm* — Koppel, Patrick, Heybl & Philpott

(57) ABSTRACT

A device for the sorted feeding of a packaging machine for bottles, which comprises elements for feeding the bottles to a carousel provided with receptacles, and comprises pickup star conveyors, each receptacle of the carousel being provided with a lever that is connected to a device for moving the lever between a first position for locking a bottle and a second, open position that allows the exit of the bottle toward a pickup star conveyor, the elements for moving the lever being actuated by a cam arranged at the position at which a bottle is accommodated in the corresponding receptacle and by a motor, which is activated by a signal that arrives from the lane connected to the pickup star conveyor that lacks a bottle.

3 Claims, 6 Drawing Sheets

(51) Int. Cl.
*B65G 47/84* (2006.01)
*B65G 29/00* (2006.01)
*B65G 47/86* (2006.01)

(52) U.S. Cl.
CPC .... *B65G 47/847* (2013.01); *B65G 2201/0244* (2013.01)

(58) Field of Classification Search
USPC ............................ 198/468.2, 459.2, 441, 450
See application file for complete search history.

(56) References Cited

U.S. PATENT DOCUMENTS

| | | | | |
|---|---|---|---|---|
| 5,590,753 A | * | 1/1997 | Bertschi | ............... B65G 47/847 198/441 |
| 5,784,857 A | | 7/1998 | Ford et al. | |
| 5,931,287 A | | 8/1999 | Fournier | |
| 6,213,309 B1 | * | 4/2001 | Dadisho | .................. B07C 5/362 198/450 |
| 6,810,645 B2 | * | 11/2004 | Cerf | ....................... B65G 47/71 53/154 |

FOREIGN PATENT DOCUMENTS

| | | |
|---|---|---|
| EP | 2567915 | 3/2013 |
| GB | 2107666 | 5/1983 |
| IE | 4332095 | 4/1995 |
| WO | 90/05102 | 5/1990 |
| WO | 00/66282 | 11/2000 |

OTHER PUBLICATIONS

Chinese Office Action from corresponding Chinese Patent Application No. 201480038239.6, dated Sep. 30, 2016.

* cited by examiner

DEVICE FOR THE SORTED FEEDING OF A PACKAGING MACHINE FOR BOTTLES AND THE LIKE

The invention relates to a device for the sorted feeding of a packaging machine for bottles and the like.

It is known that machines exist which are designed to group together sets of containers, and particularly of bottles, in packages formed from different numbers of these: such machines are known as packaging machines, and there are shrink-wrapping machines, case-packing machines, and other types.

It is clear that the individual packages, the widest-ranging, are distinguished in terms of the number of pieces that make them up and in terms of the arrangement of those pieces, which are usually grouped in rows that comprise a plurality of identical pieces, and the containers to be packed are fed to the packaging machine in a preset manner, as a function of the type of package to be produced.

However, currently known devices for feeding packaging machines have large dimensions in terms of space occupation and achieve production levels that are fairly low, and so the aim of the present invention is to devise a device that, although offering contained space occupation, can reach a good level of productivity.

The set aim and other objects of the invention which will become better apparent hereinafter are achieved by a device for the sorted feeding of a packaging machine for bottles and the like, according to the invention, said bottles and the like being able to have a cross-section of any shape, characterized in that it comprises the characteristics according to the appended claims.

Figure 1:
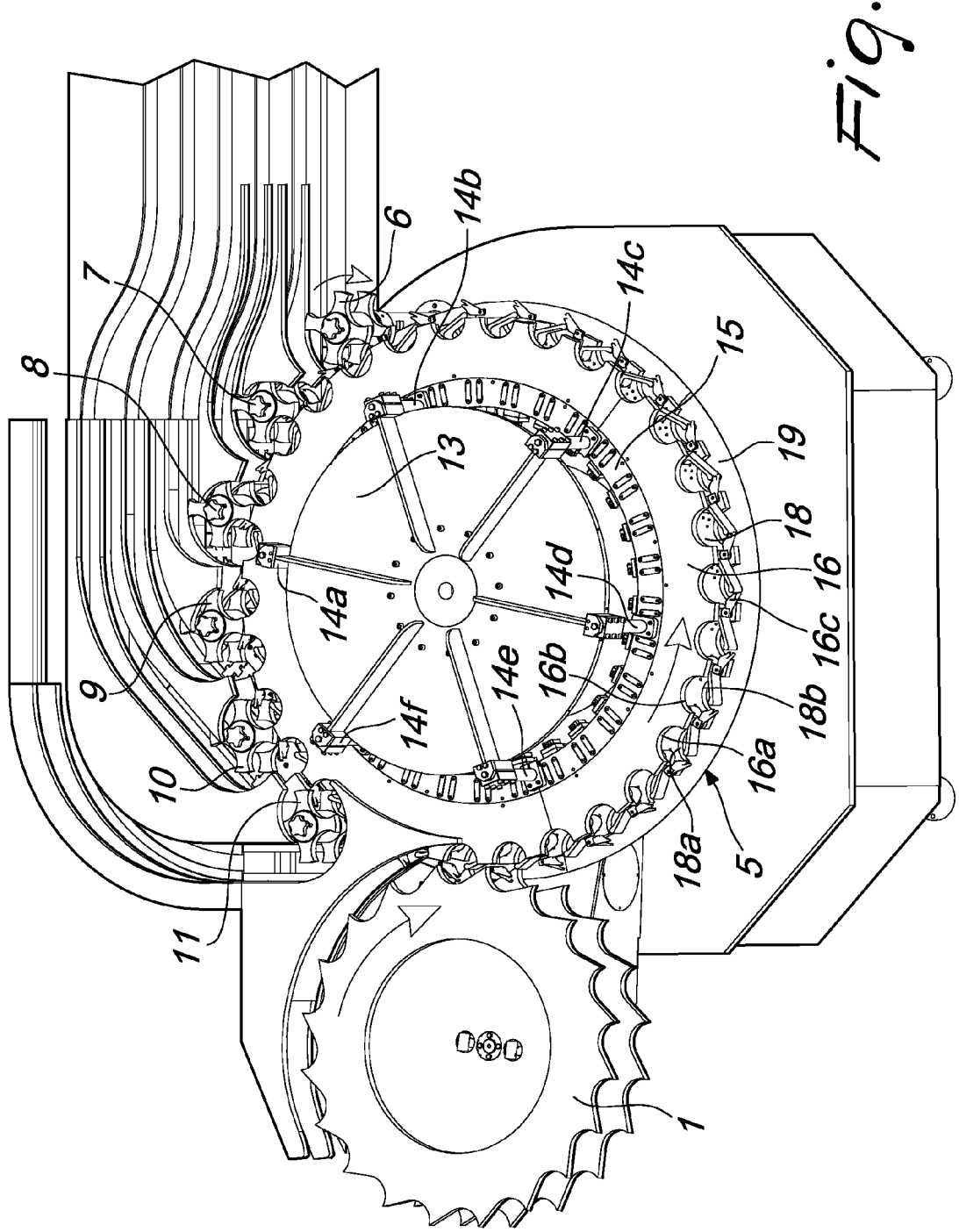
Figure 2:
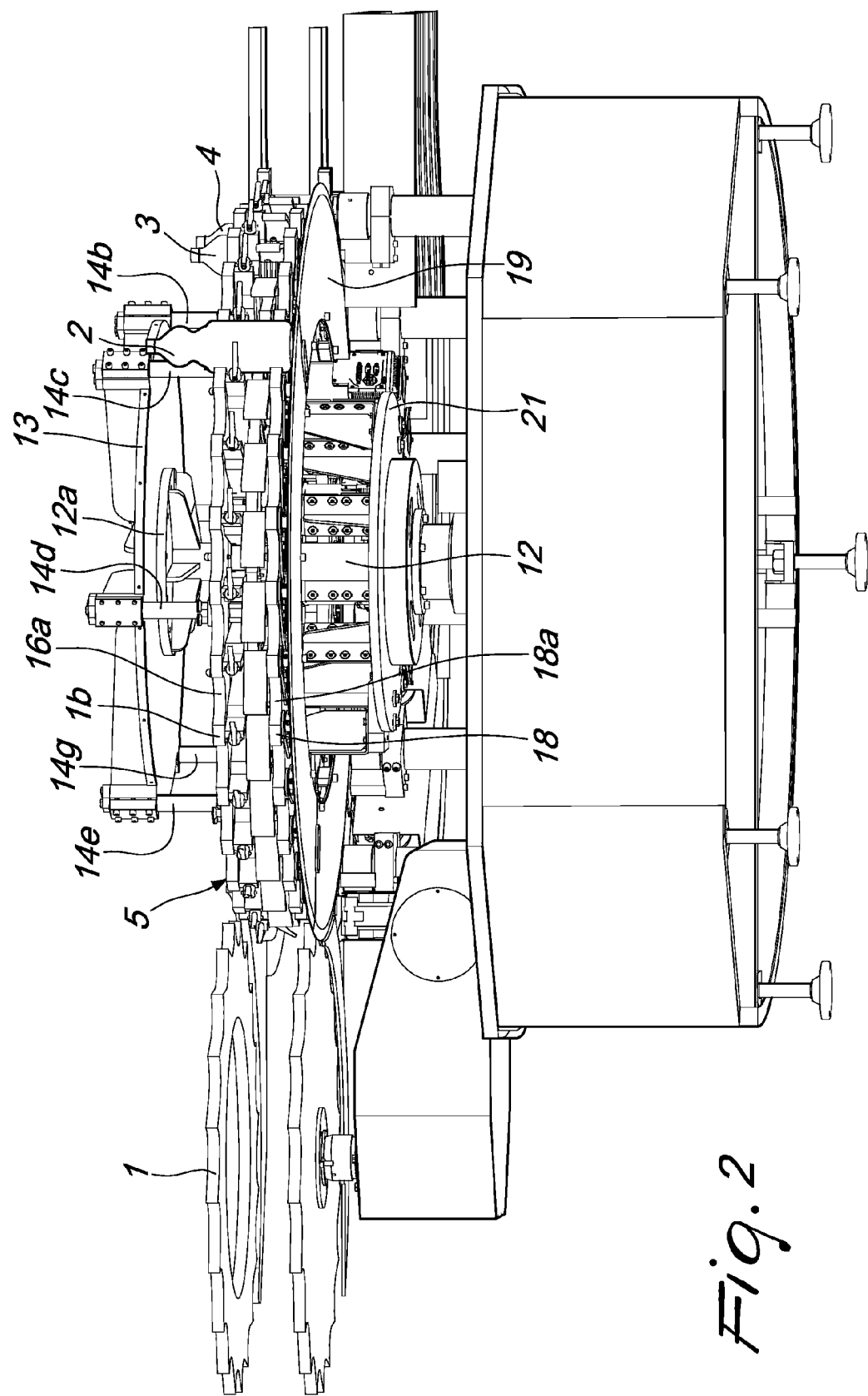
Figure 3:
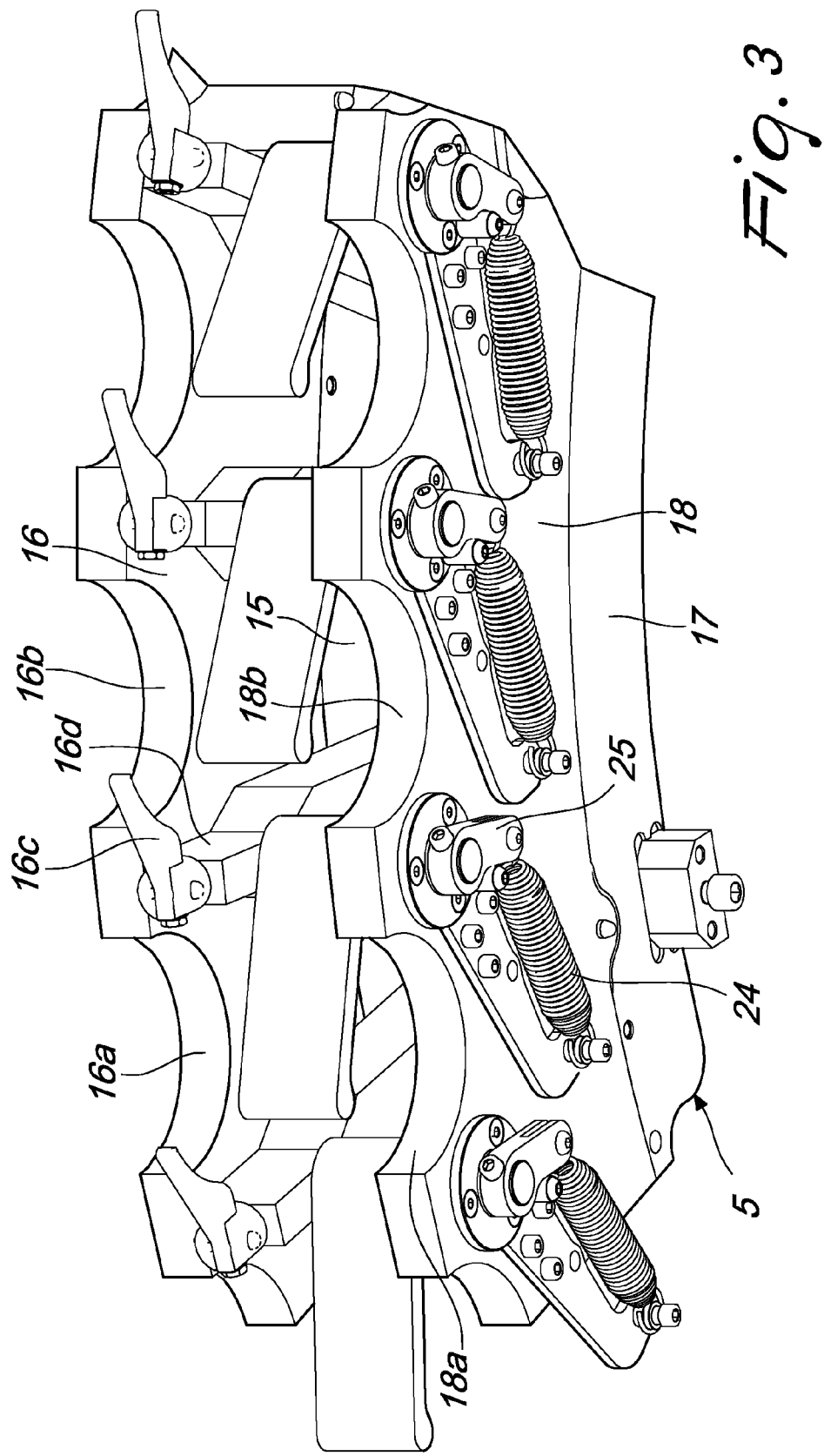
Figure 4:
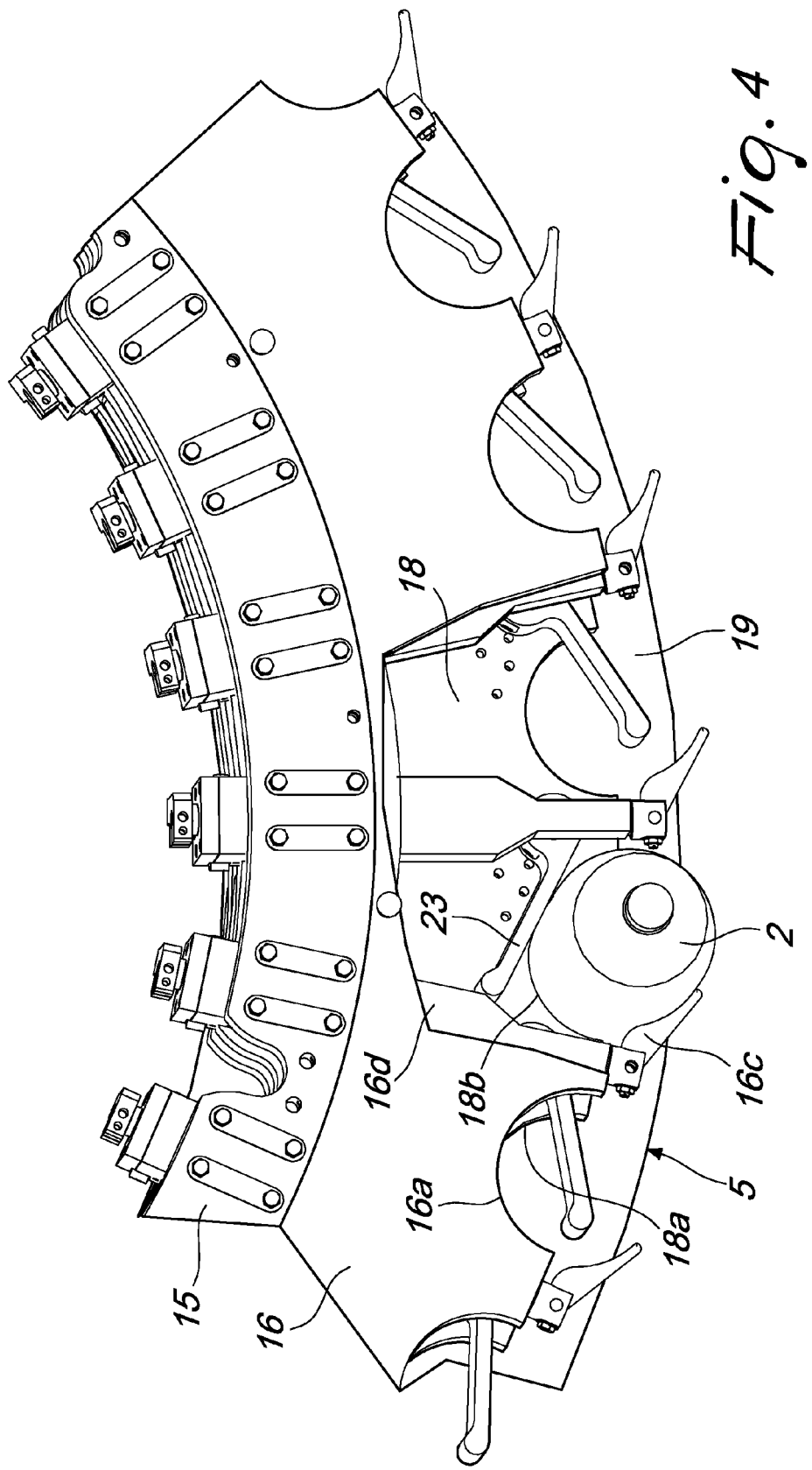
Figure 5:
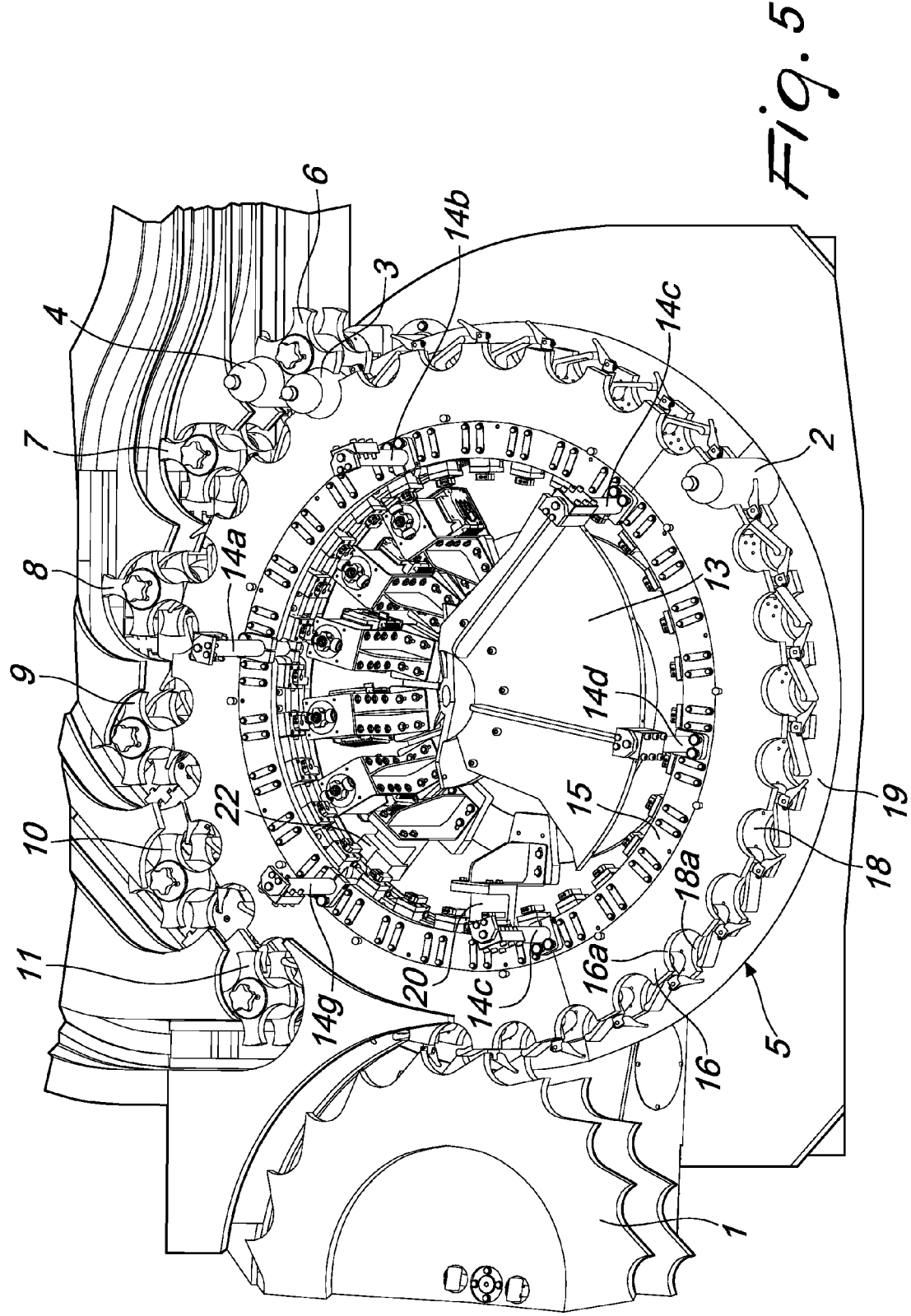
Figure 6:
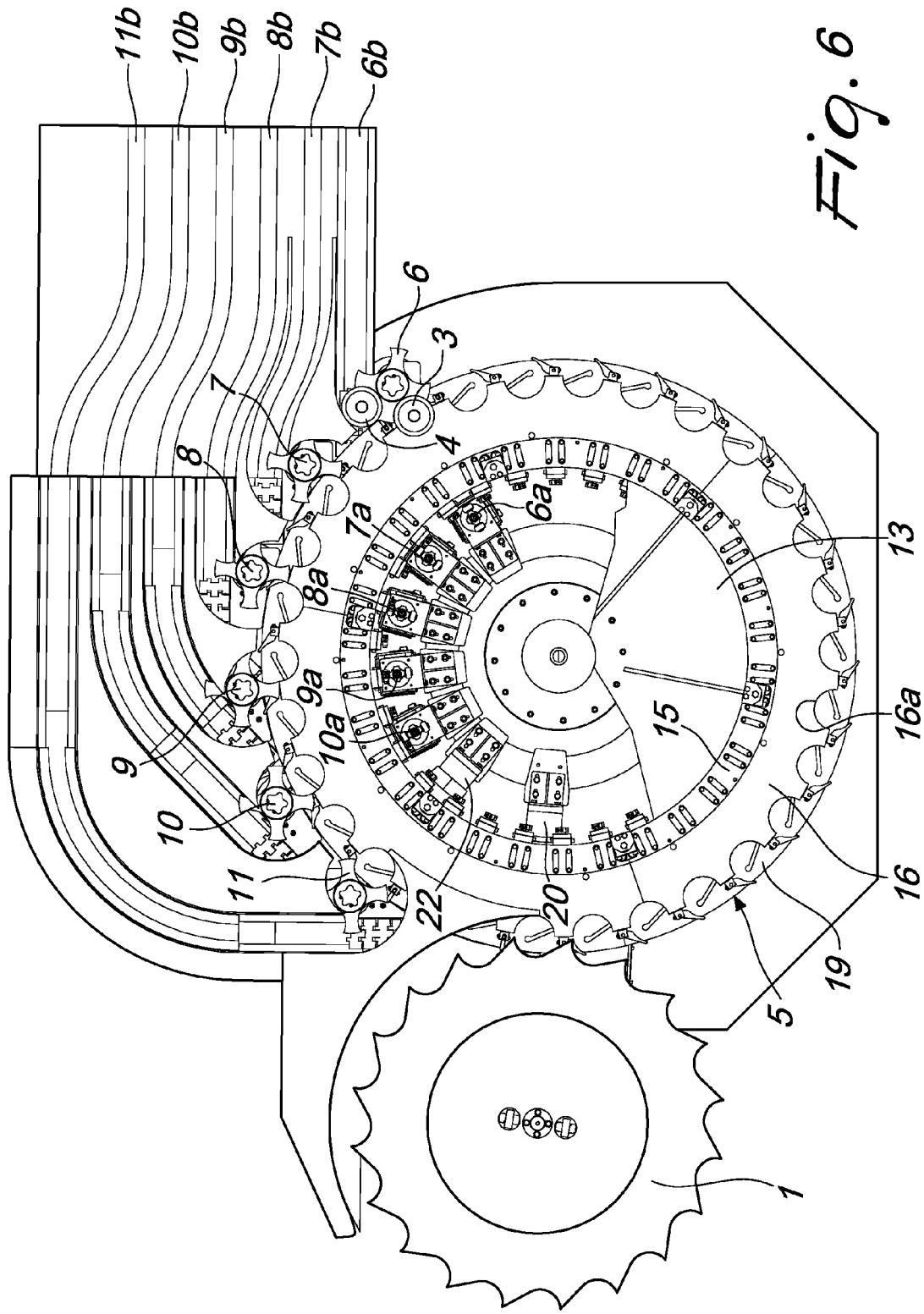

Further characteristics and advantages will become better apparent from the description of a preferred, but not exclusive, embodiment of the invention, which is illustrated by way of non-limiting example in the accompanying drawings wherein:

FIG. 1 is a general view of the device;
FIG. 2 is a view of the carousel of the device;
FIGS. 3 and 4 are views of details of the device;
FIGS. 5 and 6 are plan views of the device with the upper disk partially removed.

With reference to the figures, the reference numeral 1 generally designates a star conveyor for feeding bottles, such as 2, 3 and 4, to a carousel 5, which is comprised in the feeding means, and the details of which will be described below.

There are also means for picking up the bottles from the carousel 5, which comprise pickup star conveyors 6, 7, 8, 9, 10, 11, each one of which is adapted to guide a bottle into a specific lane of the plurality of feeding lanes 6b, 7b, 8b, 9b, 10b, 11b of the packaging machine, which are clearly shown in FIG. 6.

The carousel 5 comprises a central shaft 12 that supports, at the upper end 12a, a disk 13 connected to which are columns 14a, 14b, 14c, 14d, 14e, 14f, which support superimposed rings, and more precisely:

an upper metallic ring 15, to the peripheral region of which is removably fixed, in order to carry out the change of format, a plastic ring 16 provided with a plurality of receptacles such as 16a for the accommodation of each bottle;
a lower metallic ring 17, to the peripheral region of which is removably fixed, for changing format, a plastic ring 18 provided with receptacles such as 18a corresponding to the receptacles 16a of the ring 16;
a ring 19 for supporting bottles 2.

Each of the receptacles of the carousel 5, such as the receptacle 16b, 18b shown in FIGS. 1 and 3, is provided with a lever, 16c for said receptacle, which is connected to a device, such as 16d for the lever 16c, which is per se known and described in patent application no. EP 12153791.4 by the same Applicant, which is fixed to the lower face of the disk 15 and comprises means for moving the lever between two extreme positions: a first, horizontal extreme position, visible in FIGS. 1, 3 and 4, locking the bottle 2 in the corresponding receptacle, and a second, vertical, open extreme position that allows the exit of the bottle from the receptacle toward one of the pickup star conveyors described previously.

The movement means comprised in devices 16d for moving each individual lever are actuated in a known manner by a cam 20 in order to move the lever, from the open position, to the locking position.

The cam 20 is arranged, fixed to a fixed disk 21, at the position in which a bottle, carried by the star conveyor 1, has become fully accommodated within a receptacle of the carousel 5.

The movement means comprised in the devices such as 16d for moving each individual lever are actuated, in order to move said lever to the open position, in a first conventional manner that allows the exit of the bottle toward one of the first five star conveyors 6, 7, 8, 9, 10 and in a second conventional manner in order to cause the opening of the lever that allows the exit of the bottle toward the star conveyor 11.

In the first conventional manner, relating to the exit of a bottle toward one of the star conveyors 6, 7, 8, 9, 10, for each star conveyor there is a motor fixed to the fixed disk 21, indicated respectively with 6a, 7a, 8a, 9a, 10a, which causes the opening of the lever toward the corresponding star conveyor, and the motor is activated by a signal that arrives from respectively one of the lanes 6b, 7b, 8b, 9b, 10b that lacks a bottle.

With regard to the star conveyor 11 on the lane 11b, however, the second conventional actuation means, in order to move a lever 16c to the open position, involves the presence of a mechanical cam 22 which is fixed to the fixed disk 21 consecutively with respect to the five motors mentioned above, and this will be explained in the description of the operation.

Finally, it should be noted that for each receptacle of the carousel 5 there is a device for expelling a bottle still in the receptacle and no longer locked by the lever, which comprises, for example, a paddle that moves when it is pushed by the bottle being inserted in the receptacle, as happens for example for the paddle 23 in FIG. 4, thus tensioning an underlying spring which is comprised in the plurality of springs such as 24 in FIG. 3, and which act on a crank such as for example 25 which is integral with the paddle; the spring remains under tension for as long as the bottle is retained by the lever, as happens for example for the paddle 23 in FIG. 4, against the bottle 2, and when the lever is lowered in order to allow the bottle to exit, it acts on the paddle which carries out the expulsion of the bottle.

Operation of the invention will now be described, with particular reference to FIG. 6.

The bottles ferried by the star conveyor 1 are admitted to the carousel 5 and are progressively accommodated in the receptacles thereof, all encountering the levers opened by the cam 22, and the levers are immediately closed by way of the cam 20; the bottles proceed, such as for example the bottle 2, locked in the corresponding receptacles by the respective levers, pushed against the levers by the paddles 23 of the expulsion devices, and thus reach the region of the pickup star conveyors 6, 7, 8, 9, 10, 11.

It may happen that a detection signal arrives at the motor 6a, from the lane 6b, reporting that the lane 6b is lacking a bottle and, in this case, that same motor opens the lever that locked in place the bottle 4, which, thus, pushed by the corresponding expulsion device, is brought, as shown in FIG. 6, to a receptacle of the star conveyor 6 which gives access to the lane 6b.

The lever corresponding to the bottle 3, following the bottle 4, may also be opened by the motor 6a in the event of a repeated signal from the lane 6b and, in this case, the bottle 3 may also be picked up by the star conveyor 6, but it may remain closed in order to be opened at one of the subsequent star conveyors 7, 8, 9, 10, as a result of a signal that a bottle is needed originating from one of the lanes 7b, 8b, 9b, 10b and arriving at one of the motors 7a, 8a, 9a, 10a.

It may also happen that none of the motors is activated by a signal and, in this case, the lever will open at the mechanical cam 22, which will always intervene, with the bottle gaining access to the lane 11b; in this manner the essential condition is ensured that the carousel 5 is completely emptied, which may happen following imperfect operation of the motors such as for example 6a, such as to ensure the complete correctness of the operation.

However, it is still possible, dispensing with such ensured condition, to install, in a variation of embodiment, a motor 6a and following to serve the star conveyor 11 as well.

The invention, thus conceived, is susceptible of numerous modifications and variations, all of which are within the scope of the appended claims: thus for example there can be any number of lanes for feeding the packaging machine; and the springs such as for example 24 can be substituted by different elastic means.

The disclosures in Italian Patent Application No. VR2013A000155 from which this application claims priority are incorporated herein by reference.

The invention claimed is:

1. A device for the sorted feeding of a packaging machine for bottles and the like, comprising means for feeding the bottles to a carousel provided with receptacles for accommodating each bottle, and comprising furthermore means for picking up the bottles from the carousel which comprise a plurality of pickup star conveyors, each of which is adapted to guide a bottle picked up from the carousel into a specific lane of the plurality of feeding lanes of the packaging machine, each receptacle of the carousel being provided with a lever connected to a device which comprises means for moving said lever between two extreme positions, a first position for locking a bottle in the corresponding receptacle and a second, open position that allows the exit of the bottle from the receptacle toward a pickup star conveyor which gives access to one of the feeding lanes of the packaging machine, the means for moving the lever which are adapted to move said lever to a locking position being actuated by a cam located at the position at which a bottle is accommodated in the corresponding receptacle, the means for moving the lever being adapted to move said lever to the open position that allows the exit of the bottle toward a certain pickup star conveyor being actuated, at least for all the pickup star conveyors from the first one to the penultimate one in the order in which they are encountered by the carousel, by a motor, which is activated by a signal that arrives from the lane connected to said star conveyor that lacks a bottle, said each receptacle of the carousel being further provided with a device for expelling the bottle that is still comprised within the receptacle and is no longer locked by the lever, wherein the means for moving the lever which are adapted to move said lever to the open position that allows the exit of the bottle toward the last star conveyor encountered by the carousel, which gives access to the last feeding lane of the packaging machine, are actuated, as occurs for all the preceding star conveyors, by a motor that is activated by a signal that arrives from said last lane.

2. A device for the sorted feeding of a packaging machine for bottles and the like, comprising means for feeding the bottles to a carousel provided with receptacles for accommodating each bottle, and comprising furthermore means for picking up the bottles from the carousel which comprise a plurality of pickup star conveyors, each of which is adapted to guide a bottle picked up from the carousel into a specific lane of the plurality of feeding lanes of the packaging machine, each receptacle of the carousel being provided with a lever connected to a device which comprises means for moving said lever between two extreme positions, a first position for locking a bottle in the corresponding receptacle and a second, open position that allows the exit of the bottle from the receptacle toward a pickup star conveyor which gives access to one of the feeding lanes of the packaging machine, the means for moving the lever which are adapted to move said lever to a locking position being actuated by a cam located at the position at which a bottle is accommodated in the corresponding receptacle, the means for moving the lever being adapted to move said lever to the open position that allows the exit of the bottle toward a certain pickup star conveyor being actuated, at least for all the pickup star conveyors from the first one to the penultimate one in the order in which they are encountered by the carousel, by a motor, which is activated by a signal that arrives from the lane connected to said star conveyor that lacks a bottle, said each receptacle of the carousel being further provided with a device for expelling the bottle that is still comprised within the receptacle and is no longer locked by the lever, wherein the means for moving the lever which are adapted to move said lever to the open position that allows the exit of the bottle toward the last star conveyor encountered by the carousel, which gives access to the last feeding lane of the packaging machine, are actuated by a mechanical cam that is capable of moving to said open position all the levers that it progressively encounters.

3. A device for the sorted feeding of packing machine for bottles and the like, comprising means for feeding the bottles to a carousel provided with receptacles for accommodating each bottle, and comprising furthermore means for picking up the bottles from the carousel which comprise a plurality of pickup star conveyors, each of which is adapted to guide a bottle picked up from the carousel into a specific lane of the plurality of feeding lanes of the packaging machine, each receptacle of the carousel being provided with a lever connected to a device which comprises means for moving said lever between two extreme positions, a first position for locking a bottle in the corresponding receptacle and a second, open position that allows the exit of the bottle from the receptacle toward a pickup star conveyor which gives access to one of the feeding lanes of the packaging machine, the means for moving the lever which are adapted to move said lever to a locking position being actuated by a cam located at the position at which a bottle is accommodated in the corresponding receptacle, the means for moving the lever being adapted to move said lever to the open position that allows the exit of the bottle toward a certain pickup star conveyor being actuated, at least for all the pickup star conveyors from the first one to the penultimate one in the order in which they are encountered by the carousel, by a motor, which is activated by a signal that arrives from the lane connected to said star conveyor that lacks a bottle, said each receptacle of the carousel being further provided with a device for expelling the bottle that is still comprised within the receptacle and is no longer locked by the lever, wherein the device for expelling the bottle that is still comprised within the receptacle of the carousel and is no longer locked by the lever comprises a paddle that comes into contact with the bottle when it reaches the corresponding receptacle, and is connected to elastic means that become tensioned when the paddle pushes the bottle against the lever in the locking position, thus being able to expel the bottle when the lever opens.

\* \* \* \* \*